No Printed Specification Available
9340X
S. H. Long.
Truss Bridge.
No
Patented Jan. 23, 1836.
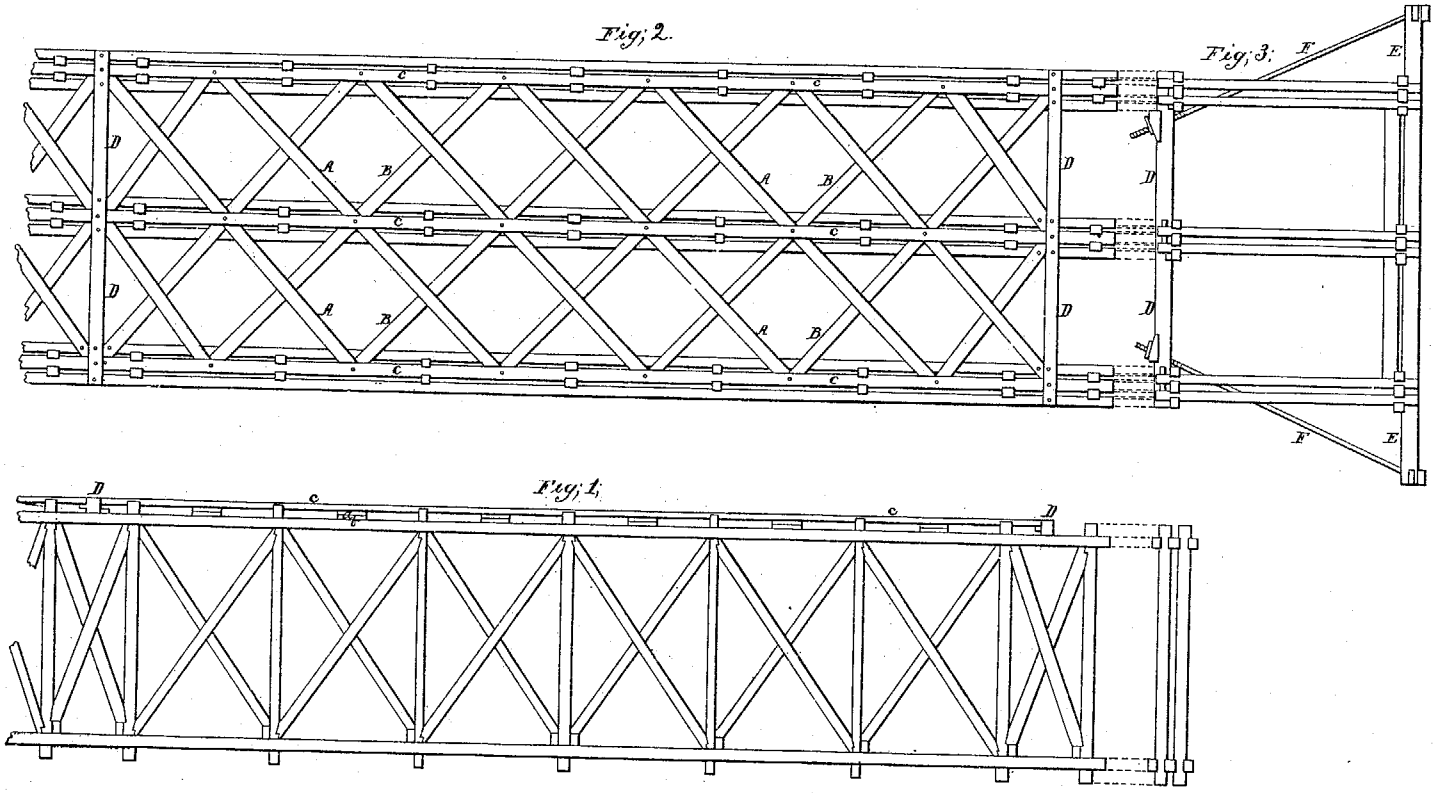
N. PETERS, PHOTO-LITHOGRAPHER, WASHINGTON D. C.

9340X
S. H. Long.
Truss Bridge.
No.
Patented Jan. 23, 1836
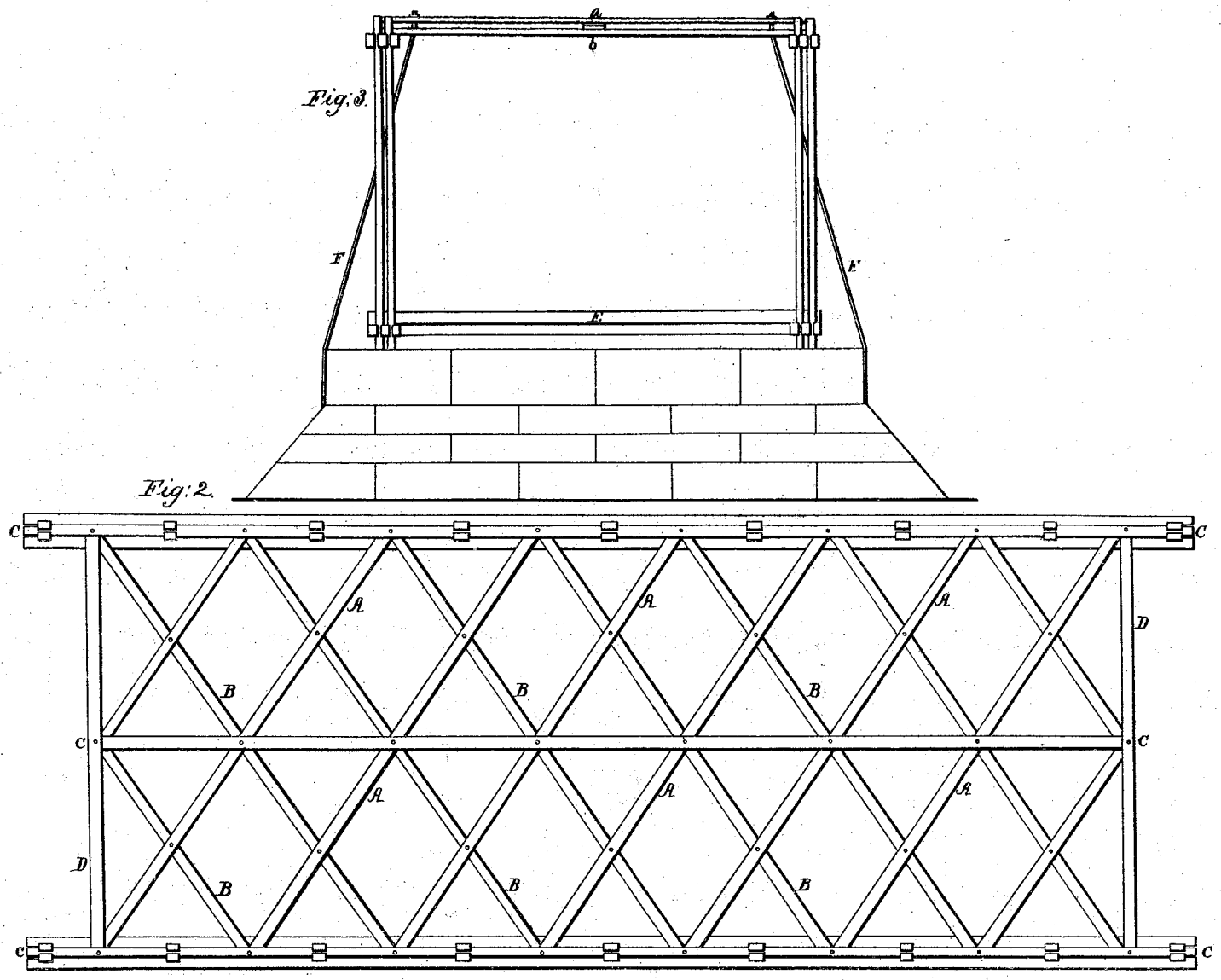
N. PETERS, PHOTO-LITHOGRAPHER, WASHINGTON, D. C.

Stephen H. Long Lt. Col. of the U.S. Topographl. Engrs.
Letters Patent

The Schedule referred to in these Letters Patent, making part of the same, containing a description in the words of the said Stephen H. Long of his improvement in the construction of Wooden Bridges

---

Specification of certain improvements in the construction of wooden or frame Bridges invented by S. H. Long Lt. Col. of the U. S. Top° Engineers – The object of these improvements is to produce and insure lateral stiffness or inflexibility in wooden or frame bridges which object is effected by means of a plan or system of bracing, applied either to the upper or the lower strings of the Bridge or to both, should it be deemed advisable, which plan or system I shall designate by the name of Lattice bracing and which is of the following description The Lattice bracing consists of timbers of suitable dimensions about 3 by 9 to 12 inches transversely and of any appropriate length applied diagonally either above or below the strings of the Bridge its application to the upper strings being deemed preferable in ordinary cases and is confined to the strings by bolts, spikes or treenails or by any or all of these modes of fastening combined; the bolts &c. passing through the brace timbers at their intersections and through or into the strings at the places where the former are attached to the latter – The arrangement of the brace timbers is such as to exhibit two sets of braces one antagonal to the other; the timbers in each set being parallel to each other or nearly so – The arrangement also provides that one set of the braces shall rest or recline upon the other in such a manner that the ends of the braces of one set shall rest ~~or recline upon the other in such a manner, that the ends of the braces of one set shall rest~~ immediately upon the ends of the other set. –

In addition to the attachment of the strings in the manner above specified, the brace timbers of each set are confined to those of the other set at every intersection by similar fastenings – Moreover the Lattice bracing may be more strongly bonded to the strings

9340X and rendered more efficient in other respects by means of binders
or streamers of suitable dimensions between which and the strings
the brace timbers intervene and which are confined to the strings &
braces by means of the same bolts, treenails or spikes (sufficiently
prolonged for this purpose) that confine the bracing to the strings
The binders or ribands are to be applied to the Lattice Bridge
in such a manner as to rest between the heads or ends of the posts
of the truss frames, the binders being notched in a manner for such
an adjustment as represented in the accompanying drawings &
the model herewith transmitted
In the use and application of the Lattice Bracing to the
upper strings of a Bridge the necessity of beams to confine the
strings together and to afford the requisite support for roofing
is entirely obviated a beam however is required in cases of this
nature over each pier and abutment to serve as a bond for the
lateral bracing and more especially to afford the means of
introducing transverse braces to better advantage Explanation of the Drawings Fig 1 represents a side
view of the bridge or rather one of its truss frames and shows
the manner in which the ends of the Lattice braces are presented
as also the position of one of the Binders or streamers —
Fig. 2. exhibits a plan or direct Bird's eye view of the Lattice
bracing and its connections with the truss frames of a Bridge
Fig 3 represents an end view of the Bridge, shewing the po-
sition of one of the piers or abutments, beams, the stay braces &
Illustrations — A. the upper set of the lateral braces
(a) the ends of the same B. the lower set of the lateral braces
(b) the ends of the same C. The Binders, Streamers or ribands
D. the beams over the abutments & Piers with their stay braces —
E The Bolsters for sustaining the Bridge F. Iron stay braces
for bracing the bridge transversely
The improvements described in the foregoing specification x and claimed as new and useful, consist in the application and use of lattice work in the manner and of the description herein explained for the purpose of imparting the requisite lateral stiffness to wooden bridges, in a manner more simple, economical and efficient, than the means heretofore employed for that purpose, it being understood that lateral and horizontal stiffness in contradistinction from vertical and transverse inflexibility is the object of the invention Witnesses
B. T. Long
Lewis R. Chesbaugh Stephen H. Long

[illegible]

852 [illegible]

[illegible]
[illegible]
[illegible]